United States Patent
Suitou et al.

(10) Patent No.: US 6,662,580 B2
(45) Date of Patent: Dec. 16, 2003

(54) AIR-CONDITIONING SYSTEM FOR VEHICLE AND ITS CONTROL METHOD

(75) Inventors: Ken Suitou, Kariya (JP); Kazuya Kimura, Kariya (JP); Ryo Matsubara, Kariya (JP); Masahiro Kawaguchi, Kariya (JP); Yasuharu Odachi, Kariya (JP); Taku Adaniya, Kariya (JP); Shoichi Ieoka, Kariya (JP); Shigeo Fukushima, Kariya (JP); Akinobu Kanai, Kariya (JP)

(73) Assignee: Kabushiki Kaisha Toyota Jidoshokki, Kariya (JP)

( * ) Notice: Subject to any disclaimer, the term of this patent is extended or adjusted under 35 U.S.C. 154(b) by 0 days.

(21) Appl. No.: 10/039,529

(22) Filed: Jan. 4, 2002

(65) Prior Publication Data

US 2002/0124580 A1 Sep. 12, 2002

(30) Foreign Application Priority Data

| Jan. 9, 2001 | (JP) | 2001-001691 |
| Apr. 4, 2001 | (JP) | 2001-106167 |
| Nov. 16, 2001 | (JP) | 2001-351516 |

(51) Int. Cl.$^7$ .............................................. F25B 49/00
(52) U.S. Cl. ................... 62/228.1; 62/230; 417/374; 417/411; 417/42; 123/339.17
(58) Field of Search ........................ 62/228.1, 228.4, 62/230, 215, 236; 417/374, 411, 44.1, 42; 123/339.17

(56) References Cited

U.S. PATENT DOCUMENTS

| 4,604,036 A | * | 8/1986 | Sutou et al. | 417/18 |
| 4,726,738 A | * | 2/1988 | Nakamura et al. | 417/22 |
| 5,186,015 A | * | 2/1993 | Roehrich et al. | 62/133 |
| 5,247,808 A | * | 9/1993 | Yoshida et al. | 62/228.4 |
| 5,497,741 A | * | 3/1996 | Tashiro et al. | 123/192.1 |
| 5,744,895 A | * | 4/1998 | Seguchi et al. | 310/266 |
| 5,924,296 A | * | 7/1999 | Takano et al. | 62/133 |
| 6,048,288 A | * | 4/2000 | Tsujii et al. | 477/5 |
| 6,196,009 B1 | * | 3/2001 | Nishi et al. | 62/155 |
| 6,219,608 B1 | * | 4/2001 | Abo et al. | 701/51 |
| 6,230,507 B1 | * | 5/2001 | Ban et al. | 62/228.4 |
| 6,369,539 B1 | * | 4/2002 | Morimoto et al. | 318/369 |
| 6,375,436 B1 | * | 4/2002 | Irie et al. | 417/223 |
| 6,530,426 B1 | * | 3/2003 | Kishita et al. | 165/202 |

FOREIGN PATENT DOCUMENTS

| JP | 4-368216 | 12/1992 | B60H/1/32 |
| JP | 11-147424 | 6/1999 | B60K/17/04 |
| JP | 2000-130320 | 5/2000 | F04B/27/14 |
| JP | 2000-179956 | 6/2000 | F25B/1/00 |
| JP | 2000-229515 | 8/2000 | B60H/1/32 |
| JP | 2000-230482 | 8/2000 | F04B/35/00 |
| JP | 02002096627 A | * | 4/2002 |

* cited by examiner

*Primary Examiner*—William E. Tapolcal
*Assistant Examiner*—Mohammad M. Ali
(74) *Attorney, Agent, or Firm*—Morgan & Finnegan, LLP

(57) ABSTRACT

An air-conditioning system for a vehicle, including a refrigerant circuit and an engine, has a battery, a compressor, an electric motor and a load torque control mechanism. The battery supplies electric power. The compressor is operative to compress refrigerant gas for the air-conditioning system. The electric motor is electrically connected to the battery. The motor is driven due to the electric power, and is operatively coupled to drive the compressor when the motor is energized. The load torque control mechanism responsive to the operating condition of the engine to control the load torque of the compressor below a predetermined value during times when the motor is driving the compressor.

16 Claims, 5 Drawing Sheets

AIR-CONDITIONING SYSTEM FOR VEHICLE AND ITS CONTROL METHOD

BACKGROUND OF THE INVENTION

The present invention relates to an air-conditioning system, which is provided with an engine for driving the vehicle and a compressor driven by a motor, and its control method.

Recently, to attain fuel efficiency of a vehicle, an idle stop control, which automatically stops an engine during an idle stop such that the vehicle stops moving at a red traffic light, is gradually adopted to vehicles. Japanese Unexamined Patent Publications No. 11-147424 and No. 2000-142091 disclose an air-conditioning system, a compressor of which is driven by a motor so as to air-condition during a stop of the engine.

A battery or a power source of the motor is charged by a generator, which is actuated by the engine. The amount of electric power accumulated in the battery decreases while the motor is driving the compressor during the stop of the engine. As the amount of electric power accumulated in the battery decreases, the engine starts to charge the battery. Therefore, the above-mentioned procedure for controlling an air-conditioning system, which does not consider the fuel efficiency, prevents in a short time the idle stop control or a device for improving the fuel efficiency from running efficiently. Accordingly, the motor needs to drive the compressor in view of power consumption of the motor.

In a hybrid type compressor, which is driven by one of the engine and the motor, as the motor is demanded for generating driving power equivalent to the engine, the motor becomes relatively large, and cannot mount the motor in an engine room. Incidentally, if a drive source of the compressor is the motor only, the arrangement of those units is not limited to the inside of the engine room, but may be the inside of a trunk room. Accordingly, in this hybrid type compressor, small motor is generally employed. Therefore, as the motor drives the compressor, an excessive load cannot be allowed to act on the motor.

SUMMARY OF THE INVENTION

The present invention addresses the above-mentioned problems traceable to idle stop control by restraining load torque of a compressor.

According to the present invention, an air-conditioning system for a vehicle, including a refrigerant circuit and an engine, has a battery, a compressor, an electric motor and a load torque control mechanism. The battery supplies electric power. The compressor is operative to compress refrigerant gas for the air-conditioning system. The electric motor is electrically connected to the battery. The motor is driven due to the electric power, and is operatively coupled to drive the compressor when the motor is energized. The load torque control mechanism responsive to the operating condition of the engine to control the load torque of the compressor below a predetermined value during times when the motor is driving the compressor.

Accordingly, while the motor is driving the compressor during the stop of the engine, power consumption of the motor is reduced and a load on the motor is decreased.

The present invention also provides a method for controlling an air-conditioning system for a vehicle, having an engine, the system including a compressor in a refrigerant circuit and an electric motor for driving the compressor. The method includes sensing the operating condition of the engine, and maintaining the load torque of the compressor below a predetermined value upon sensing a given operating condition of the engine.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention together with objects and advantages thereof, may best be understood by reference to the following description of the presently preferred embodiments together with the accompanying drawings in which:

DETAILED DESCRIPTION OF THE PREFERRED EMBODIMENTS

First through fourth embodiments of the present invention will now be described. Difference from the first embodiment will be described in the second through fourth embodiments. The left side and the right side in FIG. 1 correspond to the front end and the rear end, respectively.

Figure 1:
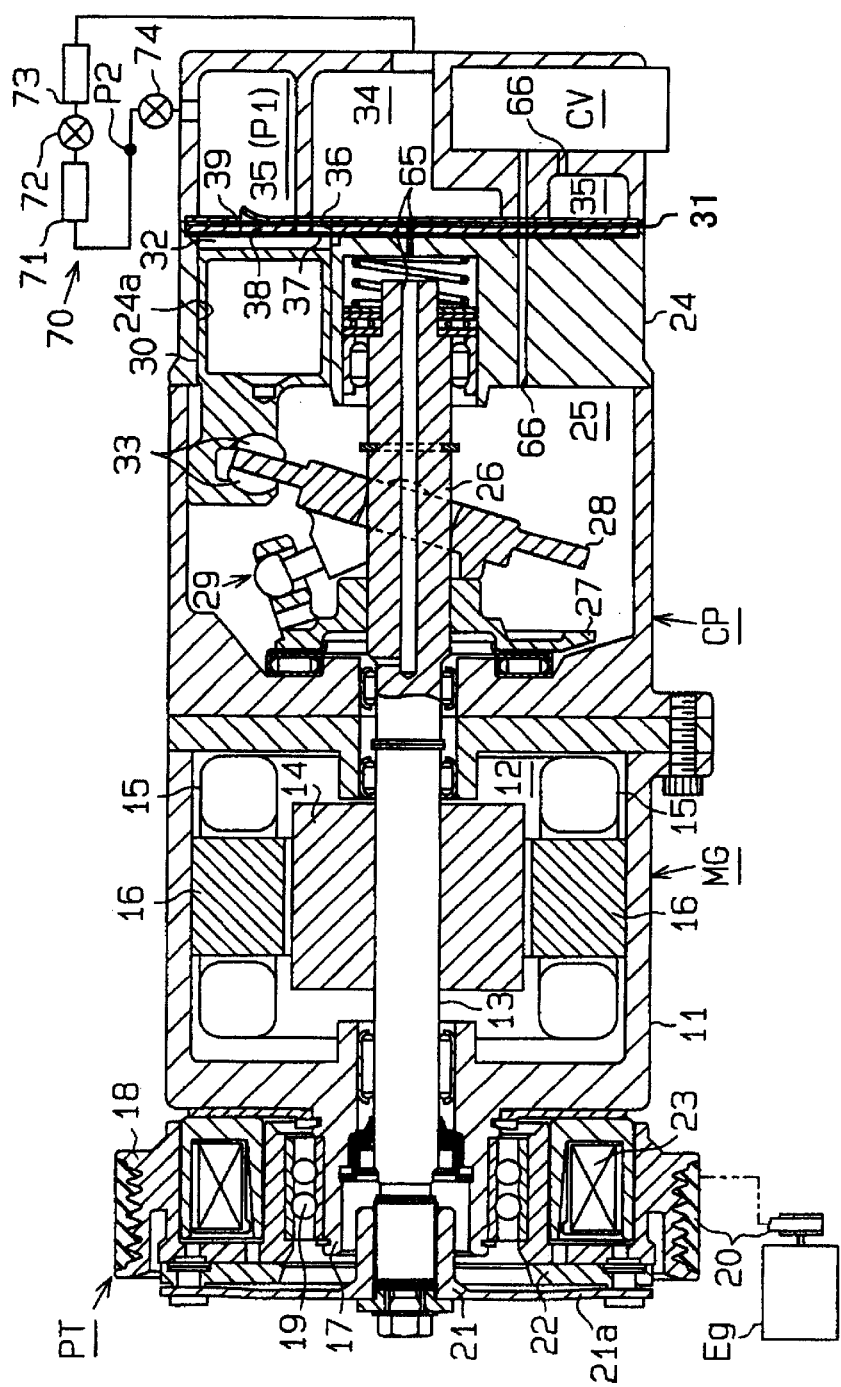
FIG. 1 is a longitudinal cross-sectional view illustrating an air-conditioning system for a vehicle according to a first embodiment of the present invention.
Figure 2:
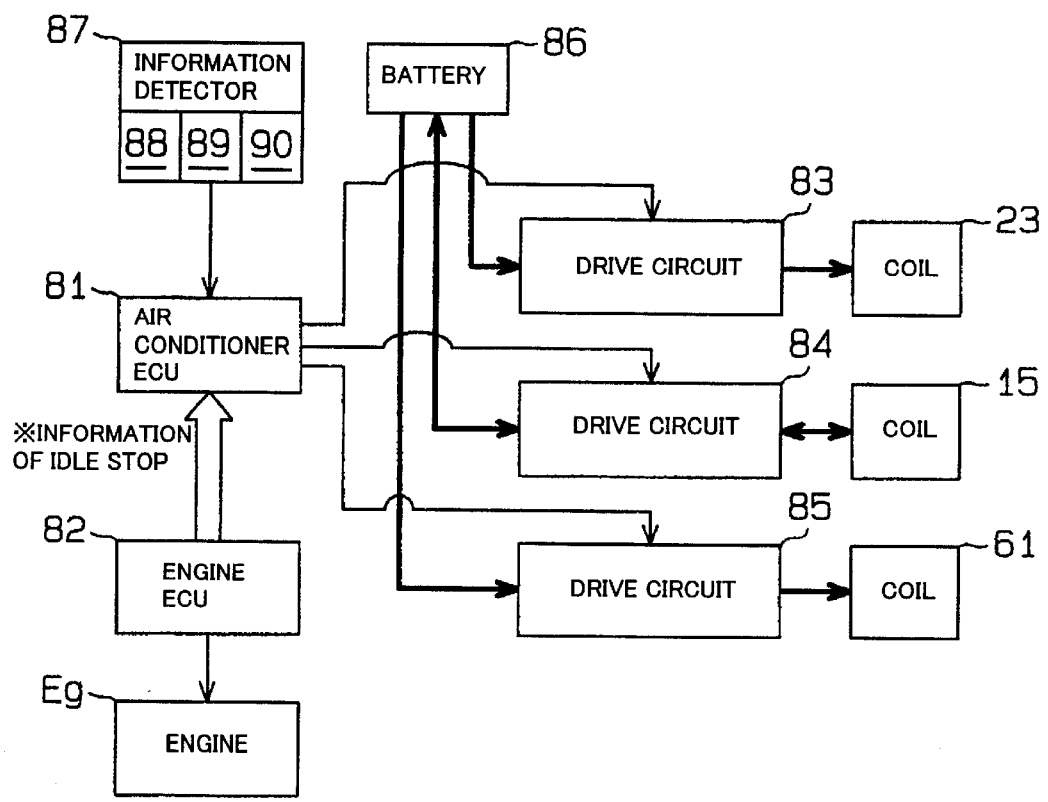
FIG. 2 is a block diagram showing a control system of an air-conditioning system for a vehicle according to the present invention.

A first embodiment of the present invention will now be described with reference to FIGS. 1 through 3. FIGS. 1 and 2 show an air-conditioning system for a vehicle. As shown in FIG. 1, a motor generator MG is operatively coupled to an internal combustion engine Eg through a power transmitting mechanism PT. A swash plate type variable displacement compressor CP constituting a refrigerant circuit (a refrigeration cycle) is operatively coupled to the motor generator MG.

As shown in FIG. 2, the vehicle provides an air conditioner ECU 81 and an engine ECU 82. The air conditioner ECU 81 controls the power transmitting mechanism PT, the motor generator MG and the compressor CP. The engine ECU 82 controls an operation of the engine Eg such as a start/stop control and an output control. Each ECU 81, 82 is an electrical control unit including a computer. The air conditioner ECU 81 and the engine ECU 82 are interconnected so as to communicate with each other.

Drive circuits 83, 84, 85 are connected to the air conditioner ECU 81. The drive circuit 83 drives the power transmitting mechanism PT. The drive circuit 84, which is constituted of an inverter and a converter, drives the motor generator MG. The drive circuit 85 drives the compressor CP. Each drive circuit 83, 84, 85 is interposed in a power supply circuit between the driving objects, which will be described in the following, and a battery 86.

For example, while the engine is ticking over after the vehicle stops moving due to a red traffic light, the engine ECU 82 controls an idle stop and automatically stops the engine without operating an ignition (not shown) by an operator. For example, when speed of the vehicle is zero and a tick-over continues over a predetermined period, the engine Eg automatically stops. The engine ECU 82 transmits information of the idle stop of the engine Eg to the air conditioner ECU 81.

As shown in FIG. 1, a motor chamber 12 is defined in a motor housing 11 of the motor generator MG. A drive shaft 13 passing through the motor chamber 12 is rotatably supported by the motor housing 11, and extends through the motor housing 11. The drive shaft 13 is operatively coupled to the engine Eg through the power transmitting mechanism PT.

A magnet 14 is secured to the drive shaft 13 in the motor chamber 12 so as to rotate integrally with the drive shaft 13. A plurality of stator cores 16 wound with a coil 15 is fixed to an inner circumferential surface of the motor housing 11 so as to surround the magnet 14.

As shown in FIG. 2, as the air conditioner ECU 81 instructs the drive circuit 84 to supply the coil 15 with an electric current, the coil is energized due to the electric current supplied from the battery 86, and the drive shaft 13 rotates. Accordingly, the motor generator MG functions as a motor.

On the contrary, as the air conditioner ECU 81 instructs the drive circuit 84 to charge the battery 86, electric power is generated at the coil 15 by driving the drive shaft 13 by the engine Eg, and is accumulated in the battery 86.

Namely, a power circuit between the battery 86 and the motor generator MG is switched over the power supply circuit to a power charge circuit and the power charge circuit to the power supply circuit by the drive circuit 84 due to the instruction of the air conditioner ECU 81. The power supply circuit supplies the motor generator MG with the electric power from the battery 86. The power charge circuit supplies the battery 86 with the electric power from the motor generator MG.

As shown in FIG. 1, in the motor generator MG, a boss 17 extends from the front end of the motor housing 11. A rotor 18 as a rotary member is rotatably supported by the boss 17 via an angular bearing 19, and is operatively coupled to the engine Eg through a belt 20.

In the motor generator MG, a hub 21 is fixed to the protrusion of the drive shaft 13 outside the motor housing 11. An armature 22 is resiliently supported by a leaf spring 21a of the hub 21. A coil 23 is secured to the front end of the motor housing 11, and is accommodated in the rotor 18.

As shown in FIG. 2, as the air conditioner ECU 81 instructs the drive circuit 83 to energize the coil 23, the coil 23 is energized due to the electric current supplied from the battery 86. Therefore, the armature 22 resists against the urging force of the leaf spring 21a and press-contacts the rotor 18, then the rotor 18 and the armature 22 are connected with each other, which is the connection of an electromagnetic clutch constituting the power transmitting mechanism PT. Accordingly, driving power generated by the engine Eg is transmitted to the motor generator MG and the compressor CP. The electromagnetic clutch couples power between the engine Eg and the motor generator MG.

In such a state, as the air conditioner ECU 81 instructs the drive circuit 83 to de-energize the coil 23, the coil 23 is de-energized. Therefore, the armature 22 is moved by the urging force of the leaf spring 21a, and is separated from the rotor 18, then the rotor 18 and the armature 22 are disconnected from each other, which is the disconnection of the electromagnetic clutch. Accordingly, the power transmitting paths between the engine Eg and the motor generator MG and between the engine Eg and the compressor CP are disconnected. As the power transmitting mechanism PT is disconnected, the driving power generated by the engine Eg is not transmitted to the motor generator MG and the compressor CP, and the driving power generated by the motor generator MG is not also transmitted to the engine Eg.

As shown in FIG. 1, a housing 24 of the compressor CP is connected to the rear end of the motor housing 11 of the motor generator MG. A crank chamber 25 as a control chamber is defined in the housing 24. A drive shaft 26 passing through the crank chamber 25 is rotatably supported by the housing 24. The front end of the drive shaft 25 protruding from the housing 24 is connected to the rear end of the drive shaft 13 of the motor generator MG so as to rotate integrally with the drive shaft 13. Accordingly, both the drive shafts 13, 26 act as one drive shaft.

A lug plate 27 is secured to the drive shaft 26 in the crank chamber 25 so as to rotate integrally with the drive shaft 25. A swash plate 28 is accommodated in the crank chamber 25. The swash plate 28 is slidably tiltably supported by the drive shaft 26. A hinge mechanism 29 is interposed between the lug plate 27 and the swash plate 28. Accordingly, the swash plate 28 is coupled to the lug plate 27 through the hinge mechanism 29 and is supported by the drive shaft 26, so that the swash plate 28 synchronously rotates with the lug plate 27 and the drive shaft 26 and tilts relative to the drive shaft 26 by sliding in a direction of an axis of the drive shaft 26.

A plurality of cylinder bores 24a (only one is shown in FIG. 1) is defined in the housing 24 so as to surround the drive shaft 26. Single-headed pistons 30 are accommodated in the associated cylinder bores 24a so as to reciprocate. Front and rear openings of the cylinder bores 24a are closed by the pistons 30 and the valve plate assembly 31, which is provided in the housing 24. Compression chambers 32, volumes of which is varied due to reciprocation of the pistons 30, are defined in the cylinder bores 24a. Each piston 30 is engaged with a periphery of the swash plate 28 through a pair of shoes 33. Accordingly, rotation of the swash plate 28 due to rotation of the drive shaft 26 is converted to the reciprocation of the pistons 30 through the shoes 33.

A suction chamber 34 and a discharge chamber 35 are defined in the rear side of the housing 24 relative to the valve plate assembly 31. Suction ports 36 and suction valves 37 are formed at the valve plate assembly 31. Discharge ports 38 and discharge valves 39 are formed at the valve plate assembly 31. Refrigerant gas in the suction chamber 34 is drawn into the compression chambers 32 via the suction ports 36 and the suction valves 37 by moving pistons 30 from a top dead center toward a bottom dead center, respectively. The refrigerant gas drawn into the cylinder bores 1a is compressed up to a predetermined pressure value by moving the pistons 30 from the bottom dead center toward the top dead center, and is discharged to a discharge chamber 35 via the discharge ports 38 and the discharge valves 39, respectively.

The housing 24 is provided with a bleed passage 65 and a supply passage 66. The bleed passage 65 intercommunicates the crank chamber 25 and the suction chamber 34. The supply passage 66 intercommunicates the discharge chamber 35 and the crank chamber 25. A control valve CV is arranged in the supply passage 66 in the housing 24.

Difference between the amount of discharged refrigerant gas introduced into the crank chamber 25 via the supply passage 66 and the amount of the refrigerant gas delivered from the crank chamber 25 is controlled by adjusting the opening size of the control valve CV, so that pressure in the crank chamber 25 is determined. Pressure difference between pressure applied to the pistons 30 in the crank chamber 25 and pressure applied to the pistons 30 in the compression chambers 32 varies in accordance with variation of the pressure in the crank chamber 25. Consequently, strokes of the pistons 30 are adjusted, and the discharge capacity of the compressor CP is adjusted.

For example, as the opening size of the control valve CV decreases, the pressure in the crank chamber 25 decreases. As the pressure in the crank chamber 25 decreases, the inclination angle of the swash plate 28 relative to a plane perpendicular to the axis of the drive shaft 26 increases, and the discharge capacity of the compressor CP increases.

On the contrary, as the opening size of the control valve CV increases, the pressure in the crank chamber 25 increases. As the pressure in the crank chamber 25 increases, the inclination angle of the swash plate 28 decreases, and the discharge capacity of the compressor CP decreases. Besides, the minimum inclination angle of the swash plate 28, or the minimum discharge capacity of the compressor CP, is not zero.

As shown in FIG. 1, the refrigerant circuit or the refrigeration cycle is constituted of the compressor CP and an external refrigerant circuit 70. The external refrigerant circuit 70 is constituted of a condenser 71, an expansion valve 72 and an evaporator 73.

In the refrigerant circuit, a check valve 74 is arranged in a refrigerant path between the discharge chamber 35 of the compressor CP and the condenser 71. The check valve 74 blocks the refrigerant path and stops circulating the refrigerant gas through the external refrigerant circuit 70 when the pressure in the discharge chamber 35 is lower than the predetermined pressure value.

A kind of valve, which mechanically detects pressure difference between the two surfaces of the valve, is adopted as the check valve 74. A kind of electromagnetic valve, which is controlled by the air conditioner ECU 81 in accordance with a value detected by a sensor for detecting discharge pressure (not shown), may also be adopted. Furthermore, a kind of valve, which is mechanically linked with the minimum inclination angle of the swash plate 28, is adopted as the check valve 74.

A first pressure monitoring point P1 is located in the discharge chamber 35. A second pressure monitoring point P2 is located in the refrigerant path remote from the first pressure monitoring point P1 toward the condenser 71 (downstream to the first pressure monitoring point P1) at a predetermined interval. The first pressure monitoring point P1 and the control valve CV are intercommunicated via a first pressure introducing passage 68, which is shown in FIG. 3. The second pressure monitoring point P2 and the control valve CV are intercommunicated via a second pressure introducing passage 69, which is shown in FIG. 3.

Figure 3:
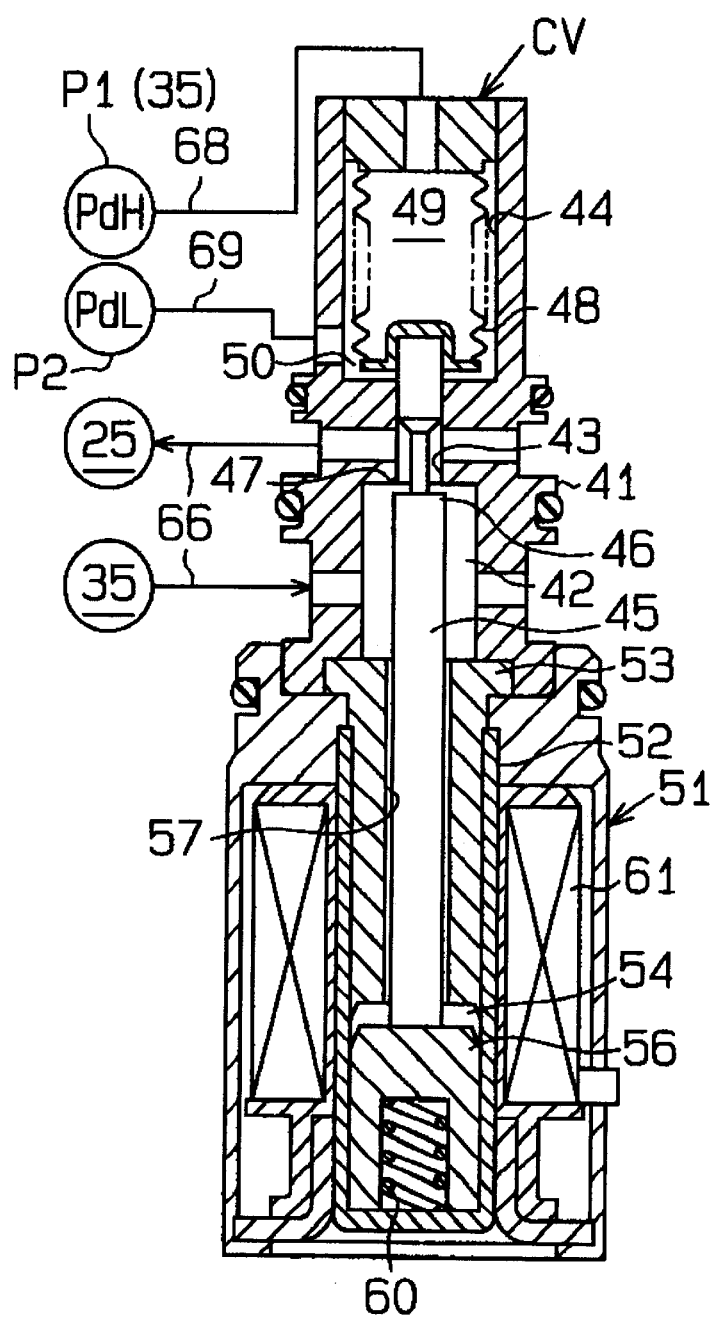
FIG. 3 is a longitudinal cross-sectional view illustrating a control valve according to the present invention.

As shown in FIG. 3, a valve chamber 42, a communication passage 43 and a pressure sensing chamber 44 are defined in a valve housing 41 of the control valve CV. A rod 45 is disposed in the valve chamber 42 and the communication passage 43 so as to move in an axial direction of the rod (in a vertical direction in FIG. 3). The communication passage 43 and the pressure sensing chamber 44 are separated from each other by the top end of the rod 45 inserted in the communication passage 43, and are not intercommunicated. The valve chamber 42 communicates with the discharge chamber 35 via a supply passage 66 upstream to the control valve CV. The communication passage 43 communicates with the crank chamber 25 via the supply passage 66 downstream to the control valve CV. The valve chamber 42 and the communication passage 43 constitute a part of the supply passage 66.

A valve body portion 46 formed on the middle of the rod 45 is disposed in the valve chamber 42. A step provided between the valve chamber 42 and the communication passage 43 constitutes a valve seat, and the communication passage 43 constitutes a kind of valve hole. As the rod 45 moves from a lowest position (a position shown in FIG. 3) to a highest position where the valve body portion 46 contacts the valve seat 47, the communication passage 43 is blocked. Namely, the valve body portion 46 of the rod 45 functions as a valve body for adjusting the opening size of the control valve CV and the amount of refrigerant gas flowing through the supply passage 66.

A pressure sensing member 48 made of a bellows is accommodated in the pressure sensing chamber 44. The top end of the pressure sensing member 48 is fixed to the valve housing 41. The top end of the rod 45 is fitted into the bottom end of the pressure sensing member 48. The pressure sensing chamber 44 is divided to a first pressure chamber 49 inside the pressure sensing member 48 and a second pressure chamber 50 outside the pressure sensing member 48, which has a cylindrical shape with an opening at one end. Pressure PdH at the first pressure monitoring point P1 is applied to the first pressure chamber 49 via the first pressure introducing passage 68, and pressure PdL at the second pressure monitoring point P2 is applied to the second pressure chamber 50 via the second pressure introducing passage 69. The pressure sensing member 48 and the pressure sensing chamber 44 sense pressure difference between the first and second pressure monitoring points.

An electromagnetic actuator 51 as means for varying the set pressure difference is provided at the bottom of the valve housing 41. The electromagnetic actuator 51 provides a cylinder 52 with an opening at one end at the center of the housing 41. A center post 53 is fitted into the cylinder 52, and is fixed to the upper opening end of the cylinder 52. Due to the center post 53 fitted into the cylinder 52, a plunger chamber 54 is defined in the bottom of the cylinder 52.

A plunger 56 is accommodated in the plunger chamber 54 so as to move in a direction of an axis of the plunger 56. A guide hole 57 extending in a direction of an axis of the center post 53 is bored through the center of the center post 53, and the lower side of the rod 45 is arranged in the guide hole 57 so as to move in a direction of an axis of the rod 45. The bottom end of the rod 45 is in contact with the top end surface of the plunger 56.

A coil spring 60 for urging the plunger 56 is accommodated in the plunger chamber 54 between an inner circumferential surface of the cylinder 52 and the plunger 56. The spring 60 urges the plunger 56 toward the rod 45. Meanwhile, the rod 45 is urged toward the plunger 56 based on spring function of the pressure sensing member 48 or a bellows spring 48. Therefore, the plunger 56 and the rod 45 integrally move up and down. Besides, the urging force of the bellows spring 48 is greater than urging force of the spring 60.

A coil 61 is wound around an outer circumferential surface of the cylinder 52 to surround the center post 53 to the plunger 56. As shown in FIG. 2, the drive circuit 85 supplies the coil 61 with the electric current from the battery 86 based on the instruction of the air conditioner ECU 81 in accordance with information detected by an information detector 87. Besides, the information detector 87 is constituted of an air conditioner switch 88 manipulated by a passenger for turning the air-conditioning system ON or OFF, a temperature sensor 89 for detecting a temperature in the passenger compartment and a temperature setting device 90 for setting a target temperature in the passenger compartment.

As the coil 61 is supplied with the electric current from the drive circuit 85, electromagnetic force or electromagnetic attraction corresponding to the intensity of the electric current is generated between the plunger 56 and the center post 53. The electromagnetic force is transmitted to the rod 45 through the plunger 56. Besides, the electric power supplied to the coil 61 is controlled by adjusting the magnitude of applied voltage, and a pulse width modulation control, or a PWM control, is adopted to adjusting the magnitude of the applied voltage.

In the control valve CV, the position of the valve body portion 46 of the rod 45 or the opening size of the control valve CV is determined as follows.

As shown in FIG. 3, while the coil 61 is supplied with no electric current (duty ratio=0%), the urging force of the bellows spring 48 dominantly determines the position of the rod 45. Therefore, the rod 45 is positioned at a lowest position, and the valve body portion 46 fully opens the communication passage 43. The pressure in the crank chamber 25 reaches a maximum value, and the difference between the pressure in the crank chamber 25 applied to the pistons 30 and the pressure in the compression chamber 32 applied to the pistons 30 increases. This results in minimum inclination of the swash plate 28, and the discharge capacity of the compressor CP is minimized.

As the discharge capacity of the compressor CP is minimized, pressure applied to the check valve 74 adjacent to the discharge chamber 35 becomes lower than the predetermined pressure value, and the check valve 74 closes. Accordingly, the refrigerant gas stops circulating through the external refrigerant circuit 70. Therefore, even if the compressor CP continues to compress the refrigerant gas, the air conditioner does not cool the passenger compartment.

The minimum inclination angle of the swash plate 28 is not zero. Therefore, even if the discharge capacity of the compressor CP is minimized, the refrigerant gas is continuously drawn from the suction chamber 34 into the compression chamber 32, and is compressed, then is discharged from the compression chamber 32 to the discharge chamber 35. Accordingly, the internal refrigerant circuit in the compressor CP is constituted of the discharge chamber 35, the supply passage 66, the crank chamber 25, the bleed passage 65, the suction chamber 34, the compression chamber 32 and the discharge chamber 35 in this order. Also, lubricant contained in the refrigerant gas circulates within the circuit in the compressor CP. Therefore, the lubricant is not discharged outside the compressor CP, and lubrication of each sliding surface, such as a sliding surface of the swash plate 28 and sliding surfaces of the shoes 33, is maintained.

In the control valve CV, while the coil 61 is supplied with the electric current, the duty ratio of which is equal to or greater than a minimum duty ratio within the variable range of the duty ratio (>0%), the electromagnetic force and the upward urging force of the spring 60 is higher than the downward urging force of the bellows 48, which causes the rod 45 to move upwardly. In such a state, the electromagnetic force and the additional upward urging force of the spring 60 act against the downward urging force of the bellows 48 and additional downward force based on pressure difference $\Delta Pd$ (=PdH−PdL). Consequently, the position of the valve body portion 46 relative to the valve seat 47 is determined based on the balance between the upward forces exerted by the electromagnetic force and the spring 60 and the downward force exerted by the bellows 48.

For example, as the speed of the engine Eg decreases and the flow rate of the refrigerant gas in the refrigerant circuit decreases, the downward force based on the pressure difference $\Delta Pd$ decreases. Accordingly, the valve body portion 46 of the rod 45 moves upwardly, and the opening size of the communication passage 43 decreases. The pressure in the crank chamber 25 tends to decrease.

Therefore, the swash plate 28 tilts in a direction to increase the inclination angle of the swash plate 28, and the discharge capacity of the compressor CP increases. As the discharge capacity of the compressor CP increases, the flow rate of the refrigerant gas in the refrigerant circuit increases, and the pressure difference $\Delta Pd$ increases.

On the contrary, as the speed of the engine Eg increases and the flow rate of the refrigerant gas in the refrigerant circuit increases, the downward force based on the pressure difference $\Delta Pd$ increases. Accordingly, the valve body portion 46 of the rod 45 moves downwardly, and the opening size of the communication passage 43 increases. The pressure in the crank chamber 25 tends to increase. Therefore, the swash plate 28 tilts in a direction to decrease the inclination angle of the swash plate 28, and the discharge capacity of the compressor CP decreases. As the discharge capacity of the compressor CP decreases, the flow rate of the refrigerant gas in the refrigerant circuit decreases, and the pressure difference $\Delta Pd$ decreases.

For example, as the upward electromagnetic force is increased by increasing the duty ratio, or the electric current supplied to the coil 61, the valve body portion 46 of the rod 45 moves upwardly, and the opening size of the communication passage 43 decreases. The discharge capacity of the compressor CP increases. Accordingly, the flow rate of the refrigerant gas in the refrigerant circuit increases, and the pressure difference $\Delta Pd$ increases.

On the contrary, as the upward electromagnetic force is decreased by decreasing the duty ratio, or the electric current supplied to the coil 61, the valve body portion 46 of the rod 45 moves downwardly, and the opening size of the communication passage 43 increases. The discharge capacity of the compressor CP decreases. Accordingly, the flow rate of the refrigerant gas in the refrigerant circuit decreases, and the pressure difference $\Delta Pd$ decreases.

In other words, the control valve CV mechanically determines the position of the valve body portion 46 of the rod 45 in accordance with variation of the pressure difference $\Delta Pd$ so as to keep the set pressure difference determined based on the duty ratio, or the electric current supplied to the coil 61. Also, the set pressure difference can externally be varied by adjusting the duty ratio.

When the engine Eg starts, the air conditioner ECU 81 connects the power transmitting mechanism PT, and switches the electric circuit between the battery 8 and the motor generator MG to the power charge circuit. Accordingly, the motor generator MG and the compressor CP are driven due to the driving power transmitted from the engine Eg. The motor generator MG generates the electric power, and charges the battery 86. The compressor CP compresses the refrigerant gas.

As the switch 88 is turned off during the operation of the engine Eg, the air conditioner ECU 81 stops supplying the coil 61 of the control valve CV with the electric current, and circulates the refrigerant gas in the compressor CP.

Disconnecting the power transmitting mechanism PT or a stop of the compressor CP may correspond to the turn-off of the switch 88. However, as the power transmitting mechanism PT is disconnected, the engine Eg does not drive the motor generator MG. As a result, the battery 86 is not charged, and the electric power accumulated in the battery 86 decreases. Since the battery 86 supplies the electrical equipments other than the motor generator MG with the electric current, it is not preferable that the battery 86 is not charged while the battery 86 is in a chargeable state or while the engine Eg is operating, considering the battery 86 charged as fully as possible is preferable for an idle stop control of the engine Eg, the idle stop control will be described later.

Receiving an idle stop signal transmitted from the engine ECU 82, the air conditioner ECU 81 disconnects the power transmitting mechanism PT. Accordingly, the motor generator MG and the compressor CP are disconnected from the engine Eg. Determining that the air conditioning (air cooling) is demanded based on the information transmitted from the information detector 87, the air conditioner ECU 81 instructs the drive circuit 84 to supply the motor generator MG with the electric power. Accordingly, the motor generator MG starts, and the compressor CP is driven by the motor generator MG. The air conditioning in the compartment of the vehicle also works during the stop of the engine Eg.

Meanwhile the air conditioner ECU 81 instructs the drive circuit 84 so as to rotate the motor generator MG at a constant speed, for example, at a speed of 1000 rpm. As a cooling load varies, the air conditioner ECU 81 varies the duty ratio for energizing the coil 61 of the control valve CV. Namely, varying the flow rate of the refrigerant gas in the refrigerant circuit (the amount of refrigerant gas discharged from the compressor CP per unit time) in accordance with variation of the cooling load is adjusted not by varying the speed of the motor generator MG but by varying the discharge capacity of the compressor CP (the amount of refrigerant gas discharged from the compressor per unit rotation).

In the present embodiment, while the motor generator MG is driving the compressor CP during the stop of the engine Eg, the load torque of the compressor CP is maintained below the predetermined value (e.g. maximum output torque of the motor generator MG).

In other words, while the motor generator MG is driving the compressor CP, the air conditioner ECU 81 controls the drive circuit 85 to set the maximum duty ratio or the electric current supplied to the control valve CV, that is, the set pressure difference, and varies the duty ratio corresponding to the signal transmitted from the information detector 87 without exceeding the maximum duty ratio. Namely, when the duty ratio calculated in accordance with the information transmitted from the information detector 87 exceeds the maximum duty ratio, the air conditioner ECU 81 transmits the maximum duty ratio to the drive circuit 85 instead of the calculated duty ratio. For example, the maximum duty ratio is set for an intermediate value in a range of variations of the duty ratio.

As described above, the flow rate of the refrigerant gas in the refrigerant circuit or the amount of the refrigerant gas discharged from the compressor CP per unit time corresponds to the pressure difference Δ Pd, and the amount of refrigerant gas discharged from the compressor CP is a physical quantity that reflects the load torque of the compressor CP. Accordingly, setting the maximum duty ratio or the set pressure difference corresponds to setting the maximum amount of the refrigerant gas discharged from the compressor CP per unit time or setting the maximum load torque of the compressor CP. Thereby, the motor generator MG is inhibited from driving in a state of exceeding a designed load.

The following advantageous effects are obtained in the present embodiment.

(1) While the motor generator MG is driving the compressor CP during the stop of the engine Eg, the load torque of the compressor CP is maintained below the predetermined value. Accordingly, an excessive loss of the electric power in the motor generator MG is inhibited, and the electric power accumulated in the battery 86 is saved. Therefore, restarting the engine Eg just for charging the battery 86 is delayed during the idle stop control of the engine Eg. Accordingly, both of maintaining the air conditioning in the vehicle compartment and controlling the idle stop for improving fuel efficiency is achieved in a high-level. Besides, as the excessive load for driving the motor generator MG does not act on the battery 86, lifetime of the battery 86 may lengthen.

Furthermore, as the load torque of the compressor CP is set so that the load torque does not exceed the set load of the motor generator MG, the motor generator MG is downsized. Since the motor generator MG is downsized, the motor generator MG is easily applied to existing vehicles, and further to an engine room arranged on the assumption that the compressor CP is driven by the engine Eg only. Namely, maintaining the load torque of the compressor CP below the predetermined value while to the motor generator MG is driving the compressor CP is efficient in controlling the hybrid type compressor CP driven by the engine Eg as well.

(2) In order to maintain the load torque of the compressor CP below the predetermined value, the flow rate of the refrigerant gas in the refrigerant circuit is maintained below a predetermined value. Accordingly, since an expensive load torque detector for directly detecting the load torque of the compressor CP is not needed, the air-conditioning system is offered at a low cost.

(3) A variable displacement type compressor is used as the compressor CP in the present embodiment. Accordingly, the flow rate of the refrigerant gas in the refrigerant circuit is varied without varying the speed of the motor generator MG, and the mechanism of the motor generator MG for driving, which is the drive circuit 84 and the air conditioner ECU 81, is simplified.

(4) The control valve CV autonomously adjusts the discharge capacity of the compressor CP in accordance with the variation of the pressure difference Δ Pd so as to maintain the set pressure difference determined by the duty ratio or the electric current supplied to the coil 61. Namely, the control valve CV directly controls the flow rate of the refrigerant gas, the flow rate reflecting the load torque of the compressor CP. Accordingly, maintaining the amount of refrigerant gas discharged from the compressor CP or the flow rate of the refrigerant gas per unit time below a predetermined value is accurately responsively controlled without using a sensor for detecting the flow rate of the refrigerant gas.

(5) The compressor CP and the motor generator MG are united. Accordingly, when the air-conditioning system is installed to the vehicle, the compressor CP and the motor generator MG is easily handled.

(6) The compressor CP and the motor generator MG are arranged in series such that both the drive shafts 13, 26 form as one drive shaft. Accordingly, a power transmitting mechanism, such as a belt or a pulley, for transmitting power between the drive shafts 13, 26 is not needed, and the structure is simplified.

Figure 4:
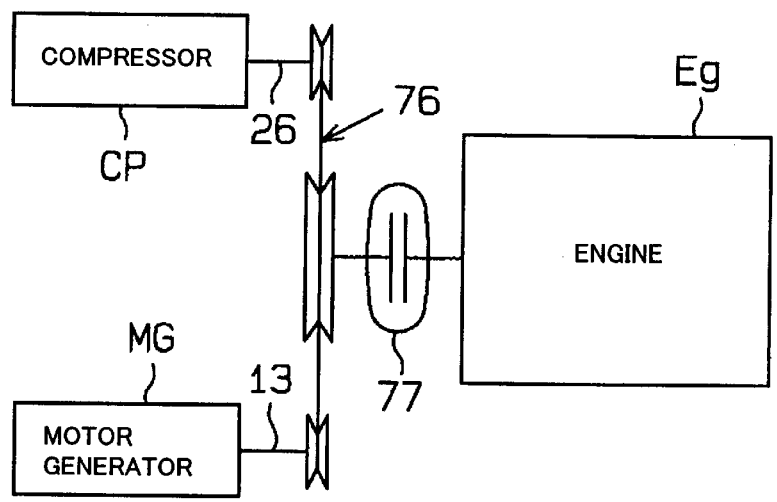
FIG. 4 is a schematic view illustrating an air-conditioning system for a vehicle according to a second embodiment of the present invention.

A second embodiment of the present invention will now be described with reference to FIG. 4. As shown in FIG. 4, an air-conditioning system for a vehicle has the motor generator MG and the compressor CP that are separated from each other. The drive shaft 13 of the motor generator MG and the drive shaft 26 of the compressor CP are operatively coupled to each other through a pulley belt mechanism 76 so as to rotate synchronously with each other. The pulley belt mechanism 76 is operatively coupled to the engine Eg through an electromagnetic clutch 77. The pulley belt mechanism 76 and the electromagnetic clutch 77 constitute the power transmitting mechanism PT in the present embodiment. The electromagnetic clutch 77 is actuated (connected or disconnected) due to the signal transmitted from the air conditioner ECU 81, as well as the electromagnetic clutch of the power transmitting mechanism PT in the first embodiment.

The advantageous effects as well as the paragraphs (1) through (4) in the first embodiment are obtained in the second embodiment. Since the motor generator MG and the compressor CP are separated from each other, the motor generator MG and the compressor CP is more selectively be arranged relative to the engine Eg, and is especially appropriate for arranging in a small engine room, as compared with the motor generator Mg and the compressor CP united with each other.

Figure 5:
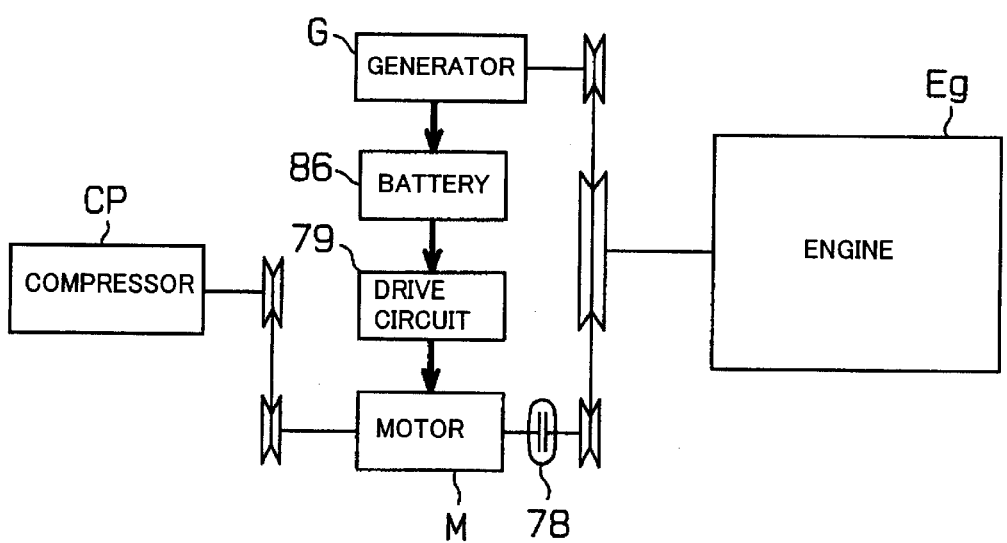
FIG. 5 is a schematic view illustrating an air-conditioning system for a vehicle according to a third embodiment of the present invention.

A third embodiment of the present invention will now be described with reference to FIG. 5. As shown in FIG. 5, an air-conditioning system for a vehicle has a motor M and a generator G that are separated from each other. The motor M and the generator G are operatively coupled to the engine Eg. An electromagnetic clutch 78 is arranged in a power transmitting path between the motor M and the engine Eg.

The compressor CP is driven by the motor M only. In other words, as the air conditioning in the vehicle compartment is needed, the air conditioner ECU 81 (shown in FIG. 2) instructs a drive circuit 79 to drive the motor M at a constant speed despite the operation or stop of the engine Eg. Meanwhile, the air conditioner ECU 81 disconnects the electromagnetic clutch 78, and prevents the motor M from transmitting power to the engine Eg.

The motor M is also used for starting the engine Eg or cranking. In other words, when the engine Eg starts, the air conditioner ECU 81 connects the electromagnetic clutch 78 based on the signal for starting the engine Eg, the signal transmitted from the engine ECU 82 (shown in FIG. 2), and instructs the drive circuit 79 to supply the motor M with the electric power. Meanwhile, the air conditioner ECU 81 stops the electric current supplied to the coil 61 of the control valve CV, and minimizes the discharge capacity of the compressor CP in order to start the engine Eg smoothly. Namely, if the air conditioning is working upon starting the engine Eg, the air conditioner ECU 81 stops the air conditioning and starts the engine Eg first.

While the air conditioning is working during the stop of the engine Eg or during the stop of the generator G, the load torque of the compressor CP is maintained below the predetermined value, as well as those in the first embodiment.

The advantageous effects as well as those in the second embodiment are obtained in the present embodiment.

Figure 6:
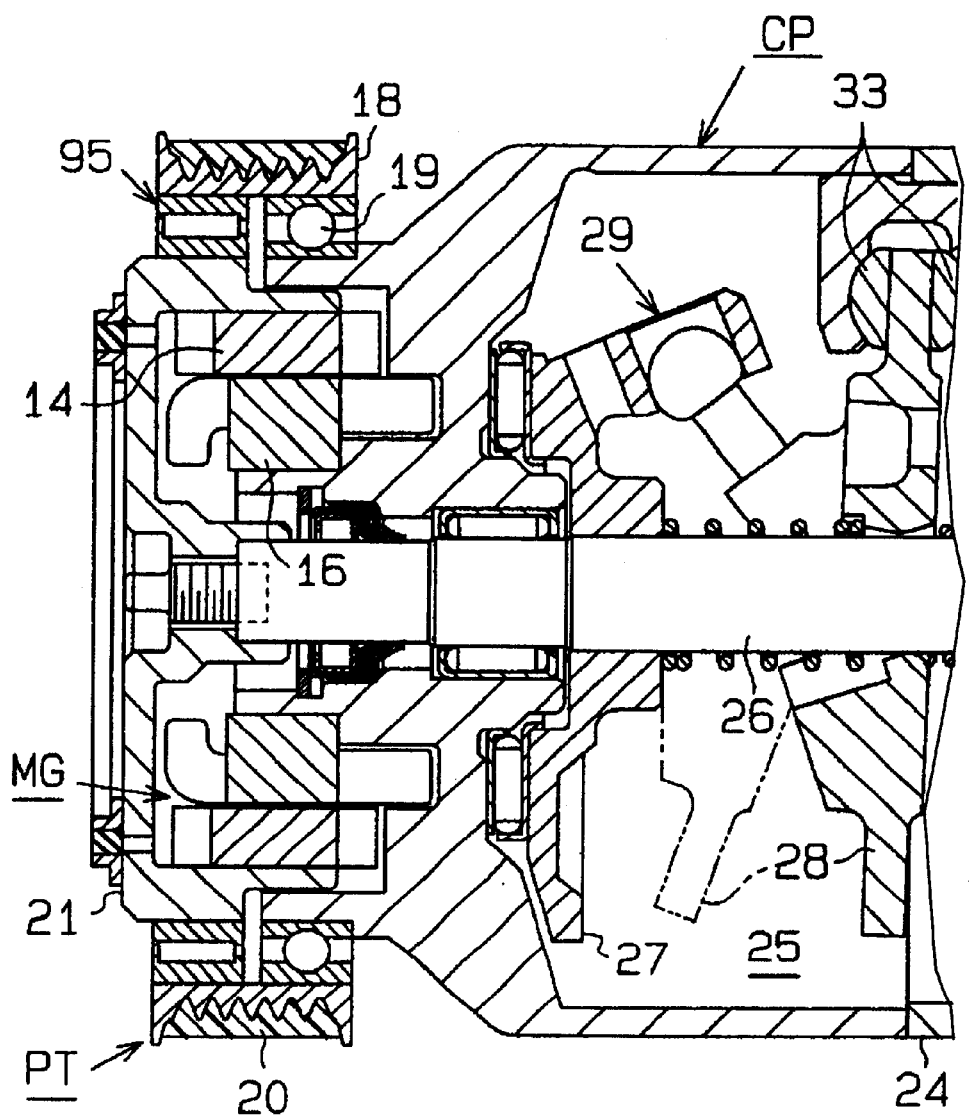
FIG. 6 is an enlarged partial longitudinal cross-sectional view illustrating an air-conditioning system for a vehicle according to a fourth embodiment of the present invention.

A fourth embodiment of the present invention will now be described with reference to FIG. 6. As shown in FIG. 6, in the above-described first embodiment, the motor housing 11 of the motor generator MG is removed, and the power transmitting mechanism PT is arranged on the housing 24 of the compressor CP. The electromagnetic clutch such as the coil 23 is removed, and a one-way clutch 95 is interposed between the rotor 18 and the hub 21. Accordingly, the drive circuit 83 (shown in FIG. 2) for driving the power transmitting mechanism PT is removed from a control system of the air-conditioning system. The motor generator MG is accommodated in the power transmitting mechanism PT, and is operatively connected to the hub 21.

Since the one-way clutch 95 blocks the power transmission from the hub 21 to the rotor 18, the driving power generated by the motor generator MG is not transmitted to the engine Eg. Meanwhile, the one-way clutch 95 permits the power transmission from the rotor 18 to the hub 21. Therefore, the driving power generated by the engine Eg is transmitted to the compressor CP and the motor generator MG through the rotor 18 and the hub 21 during the operation of the engine Eg.

The advantageous effects as well as the paragraphs (1) through (5) in the first embodiment are obtained in the fourth embodiment. Additionally, the motor generator MG is accommodated in the power transmitting mechanism PT arranged on the housing 24 of the compressor CP. In other words, since the motor generator MG is installed to a limited space in the power transmitting mechanism PT, the motor generator may further be relatively small and poor in power. Accordingly, in such a state, since the load torque of the compressor CP is maintained below the predetermined value while the motor generator MG is driving the compressor CP, the motor generator MG ensures a steady operation as a motor.

The present invention is not limited to the embodiments described above, but may be modified into the following examples.

In order to maintain the load torque of the compressor CP, the value of electric current supplied to the motor (the motor generator MG in the first, second and fourth embodiments, the motor M in the third embodiment) is maintained below a predetermined value. The value of electric current supplied to the motor MG or M reflects the output torque of the motor MG or M, that is, the load torque of the compressor CP. In this manner, since an expensive load torque detector for directly detecting the load torque of the compressor CP is not needed, the air-conditioning system is offered at a low cost.

Furthermore, for example, the value of electric current supplied to the motor MG or M is detected by a sensor in the drive circuit 84, and information of the detected value of electric current is transmitted to the air conditioner ECU 81. The air conditioner ECU 81 compares the detected value of electric current transmitted from the drive circuit 84 with the predetermined value. When the detected value of electric current exceeds the predetermined value, the air conditioner ECU 81 judges that the load torque of the compressor CP is excessive, and instructs the drive circuit 85 to decrease the duty ratio or electric current supplied to the coil 61, that is, the unit quantity of the set pressure difference for decreasing the load torque of the compressor CP.

As the unit quantity of the set pressure difference of the control valve CV is decreased, the discharge capacity of the compressor CP decreases a little, and the load torque of the compressor CP also decreases a little. As the load torque of the compressor CP decreases, the value of electric current supplied to the motor MG or M decreases. In this manner, the value of electric current supplied to the motor MG or M is maintained below the predetermined value, with a consequence of maintaining the load torque of the compressor CP below the predetermined value.

Besides, the predetermined value may correspond to the maximum output torque of the motor MG or M. Particularly, if the motor MG or M is designed to output the maximum torque due to the supplied electric current of 40 amperes while driving at a speed of 1000 rpm, which is the above-mentioned constant speed maintained by the drive circuit 84, the predetermined value is 40 amperes.

The upper limit value of electric current supplied to the motor MG or M is set, for example, to 40 amperes in another embodiment described above. In order to maintain the load torque of the compressor CP below the predetermined value, the speed of the motor MG or M is maintained above a predetermined value. Information of the speed of the motor MG or M during the motor is driving due to the upper limit electric current reflects the output of the motor MG or M, that is, the load torque of the compressor CP. In this manner, since an expensive load torque detector for directly detecting the load torque of the compressor CP is not needed, the air-conditioning system may be offered at a low cost.

Furthermore, for example, a regulator is provided in the drive circuit 84 so that the value of electric current supplied to the motor MG or M does not exceed the upper limit value. The speed of the motor MG or M is detected by a sensor arranged in the drive circuit 84, and the information of the detected speed is transmitted to the air conditioner ECU 81. The air conditioner ECU 81 compares the information of the detected speed transmitted from the drive circuit 84 with the predetermined value, for example, 800 rpm. If the information of the detected speed is less than the predetermined value, the air conditioner ECU 81 judges that the load torque of the compressor CP is excessive, and instructs the drive circuit 85 to decrease the duty ratio or electric current supplied to the coil 61 of the control valve CV, that is, the unit quantity of set pressure difference for decreasing the load torque of the compressor CP.

As the unit quantity of set pressure difference of the control valve CV is decreased, the discharge capacity of the compressor CP decreases a little, and the load torque of the compressor CP also decreases a little. As the load torque of the compressor CP decreases, the speed of the motor MG or M increases. In this manner, the speed of the motor MG or M is maintained above the predetermined value, with a consequence of maintaining the load torque of the compressor CP below the predetermined value.

The air-conditioning system for a vehicle provides a load torque detector for detecting the load torque of the compressor CP. While the air conditioning is working during the stop of the engine Eg, the air conditioner ECU 81 varies the duty ratio or the electric current supplied to the coil 61 of the control valve CV in a range where the torque detected by the load torque detector does not exceed the predetermined value.

A wobble plate type variable displacement compressor may be adopted as the compressor CP.

A rotary type compressor such as a scroll type compressor may be adopted as the compressor CP.

A fixed displacement compressor may be adopted as the compressor CP. Thereby, the amount of refrigerant gas discharged from the compressor CP or the discharge capacity per unit rotation is constant. Accordingly, while the motor generator MG in the first, second and fourth embodiments or the motor M in the third embodiment is driving the compressor CP during the stop of the engine Eg, the load torque of the compressor CP is maintained below the predetermined value by controlling the speed of the motor generator MG or the motor M.

Furthermore, in the embodiment described above, the air-conditioning system for a vehicle provides the load torque detector for detecting the load torque of the compressor CP. The speed of the motor generator MG and the motor M is varied in a range where the torque detected by the sensor does not exceed the predetermined value during the stop of the engine Eg. Also, the air-conditioning system for a vehicle further provides a pressure sensor for detecting pressure in a discharge pressure region in the refrigerant circuit. The speed of the motor generator MG and the motor M is varied in a range where the pressure detected by the pressure sensor does not exceed the predetermined pressure value during the stop of the engine Eg. Besides, the pressure in the discharge pressure region is a physical quantity that reflects the load torque of the compressor CP.

The air-conditioning system for a vehicle provides a sensor for detecting the speed of the engine Eg or physical quantity reflecting the speed of the engine Eg (e.g. the speed of the drive shaft 26). If information transmitted from the sensor corresponds to the speed of zero, the air conditioner ECU 81 itself judges that the engine Eg is in a condition of the idle stop.

The maximum load torque of the compressor CP may be varied in accordance with the electric power left in the battery 86 during the stop of the engine Eg. For example, as the electric power left in the battery 86 is relatively much, the maximum load torque is raised. As the electric power left in the battery 86 is relatively little, the maximum load torque is lowered.

The air conditioning is working during the operation of the engine Eg. In such a state, when the engine Eg is shifted to the idle stop, the air conditioner ECU 81 minimizes the discharge capacity of the compressor CP before the engine Eg stops, and disconnects the power transmitting mechanism PT after minimizing the discharge capacity, then starts the motor generator MG. In this manner, since the load torque of the compressor CP is minimum, the motor generator MG smoothly starts, and excessive consumption of the electric power upon starting the motor generator MG is inhibited.

The air conditioning is working during the operation of the engine Eg. In such a state, when the engine Eg is shifted to the idle stop, the air conditioner ECU 81 starts the motor generator MG before the engine Eg stops, and disconnects the power transmitting mechanism PT after the motor generator MG starts. In this manner, the motor generator MG smoothly starts by receiving the driving power of the engine Eg, and excessive consumption of the electric power upon starting the motor generator MG is inhibited.

According to the first embodiment, the compressor CP is operatively coupled to the engine Eg, and is disposed downstream to the motor generator MG in the power transmitting path. The present invention is not limited to the embodiments described above, the compressor CP may operatively be coupled to the engine Eg, and is disposed upstream to the motor generator MG in the power transmitting path. In other words, the compressor CP and the motor generator MG may be transposed.

The first pressure monitoring point P1 may be disposed in the suction pressure region, which is defined between the evaporator 73 and the suction chamber 34 including the evaporator 73 and the suction chamber 34, and the second pressure monitoring point P2 may be disposed in the suction pressure region downstream to the first pressure monitoring point P1.

The first pressure monitoring point P1 may be disposed in the discharge pressure region, which is defined between the discharge chamber 35 and the condenser 71 including the discharge chamber 35 and the condenser 71, and the second pressure monitoring point P2 may be disposed in the suction pressure region.

The first pressure monitoring point P1 may be disposed in the discharge pressure region and the second pressure monitoring point P2 may be disposed in the crank chamber 25, or the second pressure monitoring point P2 may be disposed in the crank chamber 25 and the first pressure monitoring point P1 may be disposed in the suction pressure region.

In other words, as described above, the first and second pressure monitoring points P1, P2 may be disposed in the refrigeration cycle, which is a main circuit of the refrigerant circuit, and the refrigeration cycle is constituted of the evaporator 73 in the external refrigerant circuit 70, the suction chamber 34, the compression chamber 32, the discharge chamber 35 and the condenser 71 in the external refrigerant circuit 70 in this order. Furthermore, positions of the first and second pressure monitoring points P1, P2 are not limited to a high pressure region and/or a low pressure region in the refrigeration cycle, but the first and second pressure monitoring points P1, P2 may be disposed in the crank chamber 25 as an intermediate pressure region constituting a refrigerant circuit for controlling the discharge capacity, and the refrigerant circuit is constituted of the supply passage 66, the crank chamber 25 and the bleed passage 65 in this order. The refrigerant circuit is regarded as a secondary refrigerant circuit.

The valve chamber 42 of the control valve CV may be communicated with the discharge chamber 35 through the communication passage 43 and the upstream of the supply passage 66. Namely, the communication passage 43 may be defined in the supply passage 66 upstream to the valve chamber 42. Thereby, pressure difference between the communication passage 43 and the second pressure chamber 50 adjacent to the communication passage 43 is reduced, and the pressures difference in the communication passage 43 and the second pressure chamber 50 is inhibited from applying to each other. Consequently, controlling the discharge capacity is further accurately performed.

Another rotary device may operatively be coupled to the motor generator MG or the motor M in addition to the compressor CP. For example, a hydraulic pump for a brake assist, a hydraulic pump for a power steering wheel, an air pump for an air suspension, a pump for circulating coolant in a cooling device for cooling the engine Eg, the motor generator MG, the motor M and the battery 50, whatever the device that drives due to the driving power inputted from the outside may operatively be coupled to the motor generator MG or the motor M.

The present invention may be applied to a vehicle driven by a hybrid engine, too.

According to the present invention, the compressor is appropriately driven by the motor during the stop of the engine in view of the stop of the engine.

Therefore, the present examples and embodiments are to be considered as illustrative and not restrictive and the invention is not to be limited to the details given herein, but may be modified within the scope of the appended claims.

What is claimed is:

1. An air-conditioning system for a vehicle, including a refrigerant circuit and an engine, comprising:
   a battery for supplying electric power;
   a compressor operative to compress refrigerant gas for the air-conditioning system;
   an electric motor electrically connected to the battery, the motor being driven due to the electric power, and operatively coupled to drive the compressor when the motor is energized; and
   a load torque control mechanism responsive to the operating condition of the engine to control the load torque of the compressor below a predetermined value during times when the motor is driving the compressor.

2. The air-conditioning system according to claim 1, further comprising:
   a generator operatively connected to the engine, the generator being driven by the engine, the generator generating the electric power, the generator charging the battery; and
   wherein the motor is driven due to the electric power supplied from the battery.

3. The air-conditioning system according to claim 1, wherein the compressor is a variable displacement type compressor, and the load torque control mechanism maintains the load torque below the predetermined value by controlling the discharge capacity of the compressor.

4. The air-conditioning system according to claim 1, wherein the load torque control mechanism maintains the load torque of the compressor below the predetermined value by maintaining the amount of refrigerant gas discharged from the compressor per unit time below the predetermined amount of refrigerant gas.

5. The air-conditioning system according to claim 1, wherein the load torque control mechanism maintains the load torque of the compressor below the predetermined value by maintaining the value of electric current supplied to the motor below a predetermined value.

6. The air-conditioning system according to claim 1, wherein the upper limit of the value of electric current supplied to the motor is set, and the load torque control mechanism maintains the load torque of the compressor below the predetermined value by maintaining the speed of the motor above the predetermined value.

7. The air-conditioning system according to claim 1, wherein the load torque control mechanism maintains the load torque of the compressor below the predetermined value while the engine automatically stops due to an idle stop control.

8. The air-conditioning system according to claim 1, wherein the compressor is operatively coupled to the engine, a drive source of the compressor is the engine during an operation of the engine, and another drive source of the compressor is the motor during the stop of the engine.

9. The air-conditioning system according to claim 8, further comprising:
   a power transmitting mechanism connected to a housing of the compressor, accommodating the motor, including a rotary member for receiving the driving power from the engine.

10. The air-conditioning system according to claim 9, wherein the power transmitting mechanism at least includes means for connecting and disconnecting a power transmitting path between the engine and the motor.

11. The air-conditioning system according to claim 1, wherein a drive source of the compressor is the motor only.

12. The air-conditioning system according to claim 1, wherein the compressor and the motor are united with each other.

13. The air-conditioning system according to claim 1, wherein the compressor and the motor are separated from each other.

14. An air-conditioning system for a vehicle, including a refrigerant circuit and an engine, comprising:

a battery for supplying electric power;

a compressor operative to compress refrigerant gas for the air-conditioning system;

an electric motor electrically connected to the battery, the motor being driven due to the electric power, and operatively coupled to drive the compressor when the motor is energized; and a load torque control mechanism responsive to the operating condition of the engine to control the load torque of the compressor below a predetermined value during times when the motor is driving the compressor;

wherein the compressor is a variable type compressor having a control chamber, the displacement of the compressor is varied in accordance with variation of pressure in the control chamber, the pressure in the control chamber is varied by adjusting the opening size of a control valve, the control valve comprising:

a pressure sensing mechanism for mechanically detecting pressure difference between first and second pressure monitoring points located in the refrigerant circuit;

a valve body moved by the pressure sensing mechanism such that the displacement of the compressor is adjusted so as to counter the change in the detecting pressure difference based on a set pressure difference;

means for varying the set pressure difference disposed in the control valve by adjusting force acting on the valve body due to an external command; and wherein the control valve varies the set pressure difference.

15. The air-conditioning system according to claim 14, wherein the first and second pressure monitoring points are located in a discharge pressure region.

16. The air-conditioning system according to claim 14, wherein the first and second pressure monitoring points are located in a suction pressure region.

* * * * *

UNITED STATES PATENT AND TRADEMARK OFFICE
CERTIFICATE OF CORRECTION

PATENT NO. : 6,662,580 B2
DATED : December 16, 2003
INVENTOR(S) : Suitou et al.

It is certified that error appears in the above-identified patent and that said Letters Patent is hereby corrected as shown below:

Column 4,
Line 32, please delete "shaft 26 and tilts" and insert therefore -- shaft 26, and tilts --;

Column 8,
Lines 15-16, please delete hard return between "decrease." and "Therefore," and make the two paragraphs one entire paragraph.

Column 9,
Line 32, please delete "Meanwhile the air" and insert therefore -- Meanwhile, the air --;

Column 10,
Line 34, please delete "while to the motor" and insert therefore -- while the motor --.

Signed and Sealed this

Eighteenth Day of May, 2004

JON W. DUDAS
*Acting Director of the United States Patent and Trademark Office*